US008647746B2

United States Patent
Wu et al.

(10) Patent No.: US 8,647,746 B2
(45) Date of Patent: Feb. 11, 2014

(54) INTERMEDIATE TRANSFER MEMBER

(75) Inventors: Jin Wu, Pittsford, NY (US); Lanhui Zhang, Webster, NY (US); Lin Ma, Pittsford, NY (US); Jonathan H. Herko, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 234 days.

(21) Appl. No.: 13/069,532

(22) Filed: Mar. 23, 2011

(65) Prior Publication Data
US 2012/0244464 A1   Sep. 27, 2012

(51) Int. Cl.
 *G03G 5/04*   (2006.01)
 *B82Y 30/00*   (2011.01)

(52) U.S. Cl.
 USPC .................. 428/421; 428/411.1; 399/121

(58) Field of Classification Search
 None
 See application file for complete search history.

(56) References Cited

U.S. PATENT DOCUMENTS

| 4,479,997 | A | * | 10/1984 | Masterson et al. ............ 428/212 |
| 5,582,937 | A | | 12/1996 | La Follette |
| 5,627,001 | A | * | 5/1997 | Vail .......................... 430/111.32 |
| 5,795,500 | A | | 8/1998 | Law et al. |
| 6,061,545 | A | * | 5/2000 | Cerrah .......................... 399/330 |
| 6,625,416 | B1 | * | 9/2003 | Badesha et al. ............... 399/308 |
| 6,830,710 | B2 | | 12/2004 | Bonnet et al. |
| 2004/0091715 | A1 | * | 5/2004 | Pickering et al. ............ 428/421 |
| 2011/0250439 | A1 | * | 10/2011 | Qi et al. ....................... 428/332 |
| 2012/0244339 | A1 | | 9/2012 | Wu et al. |
| 2012/0244464 | A1 | | 9/2012 | Wu et al. |

OTHER PUBLICATIONS

Polymer Plastics Company, Kynar, retrieved Jan. 10, 2013, http://www.polymerplastics.com/insulation_kynar.shtml, p. 1.*
Ahmed: U.S. Appl. No. 13/069,540, Office Action Mar. 25, 2013, 11 pages.
U.S. Appl. No. 13/069,530, Office Action dated May 15, 2013.

* cited by examiner

*Primary Examiner* — Callie Shosho
*Assistant Examiner* — Patrick English
(74) *Attorney, Agent, or Firm* — Hoffman Warnick LLC

(57) ABSTRACT

The present teachings provide an intermediate transfer member which includes a substrate layer and a surface layer disposed on the substrate layer. The surface layer includes a plurality of core-shell particles wherein the core is a conductive particle and the shell is a fluoroplastic dispersed in a fluoroelastomer.

18 Claims, 2 Drawing Sheets

INTERMEDIATE TRANSFER MEMBER

CROSS REFERENCE TO RELATED APPLICATIONS

This application relates to commonly assigned copending application Ser. No. 13/069,530 and Ser. No. 13/069,540, filed simultaneously herewith and incorporated by reference herein.

BACKGROUND

1. Field of Use

This disclosure is directed to an image-forming apparatus and an intermediate transfer member.

2. Background

Image-forming apparatuses in which a color or black and white image is formed by using an intermediate transfer member to electrostatically transfer toner are well known. When an image is formed on a sheet of paper in a color image-forming apparatus using such an intermediate transfer member, four color images in yellow, magenta, cyan and black, respectively, are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

Current intermediate transfer belts (ITBs) used in high speed machines are composed of multi-layer members that separate layer functions, for example, dual polyimide layer ITB (high-resistivity upper layer with low-resistivity lower layer), dual layer ITB (polyimide base layer and fluorine resin surface layer), and three layer ITB (polyimide base, elastic layer and fluorine resin top layer). The common design includes a polyimide base layer plus a functional surface layer, where the polyimide base layer provides mechanical integrity, while the surface layer provides certain functionality such as low surface energy.

The top fluorine resin surface layer in multi-layer ITBs is typically VITON (a fluoroelastomer), PFA or PTFE (fluoroplastics). Such surface layers are hydrophobic and somewhat oleophobic with a hexadecane contact angle of about 45°. More oleophobic surface layers are desirable for ITBs.

SUMMARY

According to various embodiments, the present teachings provide an intermediate transfer member which includes a substrate layer and a surface layer disposed on the substrate layer. The surface layer includes a plurality of core-shell particles wherein the core is a conductive particle and the shell is a fluoroplastic, dispersed in a fluoroelastomer.

A further aspect disclosed herein is an intermediate transfer member that includes a bottom layer of a polyimide polymer and a surface layer disposed on the bottom layer. The surface layer includes a plurality of core-shell particles wherein the core is a bronze particle and the shell is a polytetrafluoroethylene, dispersed in a fluoroelastomer.

A further aspect disclosed herein is an intermediate transfer member that includes a bottom layer of a polyimide polymer and a surface layer disposed on the bottom layer. The surface layer includes a plurality of core-shell particles wherein the core is a carbon particle and the shell is a polytetrafluoroethylene, dispersed in a fluoroelastomer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
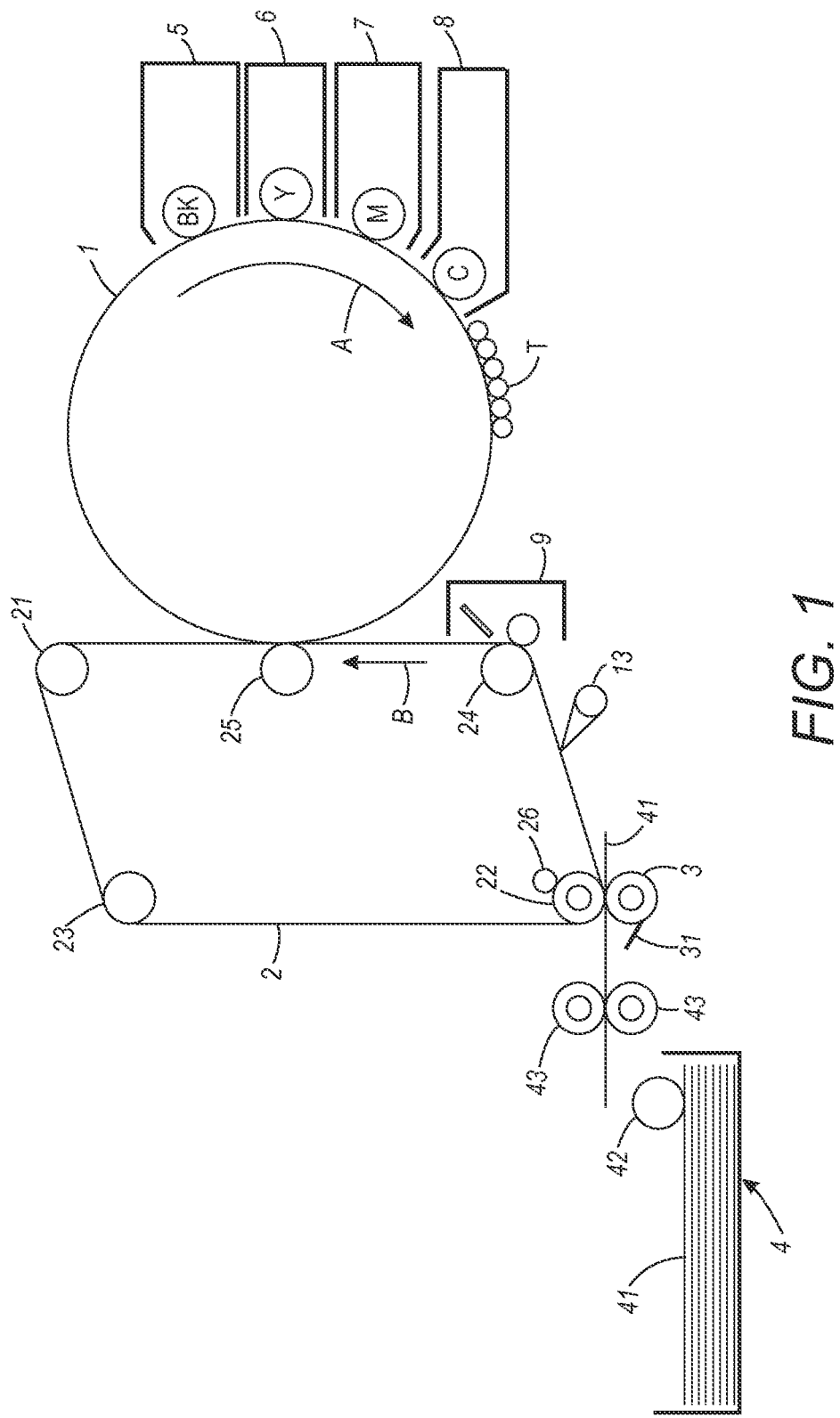
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having an intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also be used.

The charging unit is not particularly limited, and known chargers may be used, such as a contact type charger using conductive or semiconductive roller, brush, film and rubber blade, scorotron charger or corotron charge making use of corona discharge, and others. Above all, the contact type charging unit is preferred from the viewpoint of excellent, charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be the same as the first transfer unit such as a contact type transfer charger using transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as image carrier, a transfer member 2 as an intermediate transfer member such as a transfer belt, a bias roller 3 as transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with the backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred, is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device. In the case of transfer of multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Figure 2:
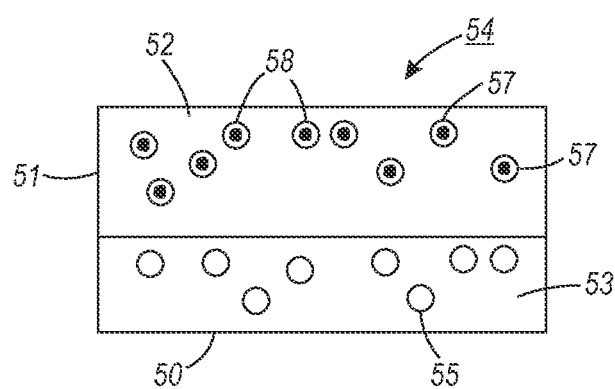
FIG. 2 is a schematic representation of an embodiment disclosed herein.

In an embodiment shown in FIG. 2, the intermediate transfer member 54 is in the form of a film in a two layer configuration. The intermediate transfer member 54 includes a polyimide substrate layer 50. The bottom polyimide substrate layer 50 includes a polyimide matrix 53 and optionally, conductive particles 55. The multi-layer intermediate transfer member includes hydrophobic and oleophobic surface layer 51 on top of the polyimide substrate layer 50. The surface layer 51 includes conductive fillers in a fluoroelastomer matrix 52. The conductive fillers include a conductive core 57 with a fluoroplastic shell 58.

The surface layer 51 provides a layer that has a low surface energy. The surface layer exhibits a water contact angle of from about 100° to about 150°, or from about 105° to about 135°, or about 110° to about 130°. The hexadecane contact angle of the surface layer is from about 50° to about 90°, or from about 55° to about 85°, or about 60° to about 80°. As comparison, a fluoroplastic, such as polytetrafluorethylene or a fluoroelastomer, such as VITON usually exhibit a water contact angle of about 110°, and a hexadecane contact angle of about 45°. In addition, the resistivity of the disclosed coating is from about $10^5$ ohm/square to about $10^{16}$ ohm/square, or from about $10^{11}$ ohm/square to about $10^{15}$ ohm/square, or from $10^{12}$ ohm/square to about $10^{14}$ much less resistive than a VITON or PTFE coating, due to the conductive nature of the core shell filler.

Suitable polyimides 53 for the substrate layer 50 include those formed from various diamines and dianhydrides, such as poly(amide-imide), polyetherimide, siloxane polyetherimide block copolymer such as, for example, SILTEM STM-1300 available from General Electric, Pittsfield, Mass., and the like. For example, polyimides that include aromatic polyimides such as those formed by the reacting pyromellitic acid and diaminodiphenylether are sold under the tradename KAPTON®-type-HN, available from DuPont. Another suitable polyimide available from DuPont and sold as KAPTON®-Type-FPC-E, is produced by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]-hexafluoropropane available as EYMYD type L-20N from Ethyl Corporation, Baton Rouge, La. Other suitable aromatic polyimides include those containing 1,2,1',2'-biphenyltetracarboximide and para-phenylene groups such as UPILEX®-S available from Uniglobe Kisco, Inc., White Planes, N.Y., and those having biphenyltetracarboximide functionality with diphenylether end spacer characterizations such as UPILEX®-R also available from Uniglobe Kisco, Inc. Mixtures of polyimides can also be used.

Examples of conductive fillers 55 for substrate layer 50 include carbon such as carbon black, graphite, acetylene black, fluorinated carbon black, graphene, carbon nanotube, carbon fiber and the like; metal oxides and doped metal oxides, such as tin oxide, antimony dioxide, antimony-doped tin oxide, titanium dioxide, indium oxide, zinc oxide, indium oxide, indium-doped tin trioxide, polyanilines and polythiophenes, and mixtures thereof. The conductive filler may be present in an amount of from about 1 part by weight to about 60 parts by weight, or from about 3 parts by weight to about 40 parts by weight, or from about 5 parts by weight to about 20 parts by weight of total solids of the substrate layer 50.

The surface layer 51 includes a fluoroelastomer matrix 52. The flruoroelastomers are from the class of 1) copolymers of two of vinylidenefluoride, hexafluoropropylene, and tetrafluoroethylene; such as those known commercially as VITON A® 2) terpolymers of vinylidenefluoride, hexafluoropropylene, and tetrafluoroethylene, those known commercially as VITON B®; and 3) tetrapolymers of vinylidenefluoride, hexafluoropropylene, tetrafluoroethylene, and a cure site monomer those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS® TH® NH®, P757® TNS®, T439®, PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

Core-Shell Particles

The core-shell particles comprise a conductive core 57. The core 57 of the conductive particles is a material selected from the group consisting of carbon black, carbon nanotube, carbon fiber, graphene, graphite, metal such as copper, aluminum, gold, silver, iron, nickel and bronze, and metal oxide such as tin oxide, zinc oxide and titanium oxide. The core size is from about 10 nanometers to about 1,000 nanometers, or from about 100 nanometers to about 800 nanometers, or from about 200 nanometers to about 600 nanometers.

The shell 58 of the core shell particles comprises a fluoroplastic. Fluoroplastics include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. Fluoroplastics provide chemical and thermal stability and have a low surface energy. Fluoroplastic shells provide chemical and thermal stability and have a low surface energy. The fluoroplastic shell is present in an amount of from about 1 weight percent to about 80 weight percent, or from about 5 weight percent to about 60 weight percent, or from about 10 weight percent to about 40 weight percent of the core shell particle.

One commercial example of the bronze PTFE core shell filler is AGLOFLON® 60BZ bronze PTFE core shell filler with a resistivity of $10^7$ ohm*cm; and one commercial example of the carbon PTFE core shell filler is AGLOFLON® 1.2CSC carbon PTFE core shell filler with a resistivity of $10^3$ ohm*cm, both obtained from Ausimont USA.

The thickness of the surface layer 51 is from about 1 micron to about 150 microns, or from about 10 microns to about 100 microns.

The surface layer 51 is prepared by dispersing the core-shell particles having the conductive core and the fluoroplastic shell, fluoroelastomers and a solvent. The solvent is selected from the group consisting of tetrahydrofuran, methyl ethyl ketone, methyl isobutyl ketone, N,N'-dimethylformamide, N,N'-dimethylacetamide, N-methylpyrrolidone and methylene chloride. In embodiments, the weight ratio of the fluoroelastomers to the core-shell particles in the coating composition is about 99/1 to about 50/50, or from about 95/5 to about 65/35, or from about 90/10 to about 80/20.

The surface layer 51 may further comprise another conductive filler selected from carbons such as carbon black, graphite, acetylene black, fluorinated carbon black, graphene, carbon nanotube, carbon fiber, and the like; metal oxides and doped metal oxides, such as tin oxide, antimony dioxide, antimony-doped tin oxide, titanium dioxide, indium oxide, zinc oxide, indium oxide, indium-doped tin trioxide, polyanilines and polythiophenes, and mixtures thereof. The conductive filler may be present in an amount of from about 1 part by weight to about 30 parts by weight, or from about 3 parts by weight to about 25 parts by weight, or from about 5 parts by weight to about 20 parts by weight of total solids of the surface layer 51.

In embodiments the surface layer coating composition of comprises a weight percent solids of from about 5 weight percent to about 50 weight percent, or from about 7 weight percent to about 45 weight percent or from about 10 weight percent to about 40 weight percent.

The surface coating mixture or solution is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

The coating mixture or solution is coated on the polyimide substrate layer 50 and cured. After the coating composition is coated, heat is applied to remove the solvent and cure the fluoroelastomer particles. The temperatures heating for solvent removal and curing is from about 120° C. to about 250° C., or from about 140° C. to about 240° C., or from about 150° C. to about 230° C. The time required for solvent removal varies with the temperature. In embodiments the time is from about 1 hour to about 8 hours or from about 2 hours to about 7 hours or from about 3 hours to about 6 hours.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Experimentally, the bronze PTFE core shell filler or the carbon PTFE core shell filler was dispersed in a VITON® GF/curative/MIBK solution (about 15 weight percent solid) via Attritor milling, respectively. The resulting dispersions (VITON® GF/AGLOFLON® 60BZ or VITON® GF/AGLOFLON® 1.2CSC=80/20) were coated on a polyimide ITB via a draw bar coater, and subsequently cured at 75° C. for 20 minutes, 150° C. for 30 minutes and 275° C. for 60 minutes, and a 10 μm thick surface layer was obtained. The disclosed surface layer had excellent adhesion (do not peel) to the polyimide bottom layer. The dual layer ITB was flat with no curl or stretch.

The surface layers were further tested for contact angles and resistivity, and the results are shown in Table 1, and the data of PTFE or VITON alone are also included for comparison.

TABLE 1

|  | VITON/bronze PTFE core shell filler = 80/20 surface layer | VITON/carbon PTFE core shell filler = 80/20 surface layer | PTFE | VITON |
|---|---|---|---|---|
| Water contact angle | 110° | 137° | 110° | 110° |
| Hexadecane contact angle | 60° | 73° | 45° | 45° |
| Resistivity (ohm/square) | $2.3 \times 10^{14}$ | $1.2 \times 10^{12}$ | $1.0 \times 10^{16}$ | $1.0 \times 10^{16}$ |

When compared with PTFE or VITON surface layers, the disclosed ITB surface layer is more oleophopbic (higher hexadecane contact angle), which is critical for toner transfer and cleaning since toner is mostly oil in nature. Furthermore, when compared with the bronze PTFE core shell filler/VITON surface layer, the carbon PTFE core shell filler/VITON surface layer is more hydrophobic, more oleophobic and more conductive (resistivity within the ITB function range).

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. An intermediate transfer member comprising:
  a substrate layer; and
  a surface layer disposed on the substrate layer comprising a plurality of core-shell particles wherein the core is a conductive particle and the shell consists of a fluoroplastic, the core-shell particles dispersed in a fluoroelastomer, and wherein the surface layer comprises a hexadecane contact angle of from about 50° to about 90° wherein the intermediate transfer member transfers a toner image onto a transfer material.

2. The intermediate transfer member of claim 1 wherein the conductive particle comprises a material selected from the group consisting of carbon black, carbon nanotube, carbon fiber, graphene, graphite, metal and metal oxide.

3. The intermediate transfer member of claim 1 wherein the fluoroelastomer is selected from the group consisting of copolymers of two of vinylidenefluoride, hexafluoropropylene, and tetrafluoroethylene; terpolymers of vinylidenefluoride, hexafluoropropylene, and tetrafluoroethylene; and tetrapolymers of vinylidenefluoride, hexafluoropropylene, tetrafluoroethylene, and a cure site monomer.

4. The intermediate transfer member of claim 1 wherein the fluoroplastic is selected from the group consisting of polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene, and mixtures thereof.

5. The intermediate transfer member of claim 1 wherein the fluoroelastomer and the plurality of core-shell particles are present in a weight ratio of from about 99 to 1 to about 50 to 50.

6. The intermediate transfer member of claim 1 wherein the surface layer comprises a water contact angle of from about 100° to about 150°.

7. The intermediate transfer member of claim 1 wherein the substrate layer comprises a polymer selected from the group consisting of polyesters, polyurethanes, polyimides, fluorinated polyimides, polyamideimdes, polyolefins, polyamides, polyetherimides, polyphenylene sulfides, polysulfones, polycarbonates, PVDF and acrylics.

8. The intermediate transfer member of claim 1, wherein the substrate layer further comprises a filler selected from the group consisting of carbon black, polyaniline, polythiophene, metal oxides and donor salts.

9. The intermediate transfer member of claim 1 wherein the surface layer comprises a surface resistivity of from about $10^5 \Omega$/square to about $10^{16} \Omega$/square.

10. The intermediate transfer member of claim 1 wherein the surface layer has a thickness of from about 1 micron to about 150 microns.

11. The intermediate transfer member of claim 1 wherein the substrate layer comprises polyimide.

12. The intermediate transfer member of claim 1 wherein the shell comprises a thickness of from about 1 nm to about 1000 nm.

13. The intermediate transfer member of claim 1 wherein the conductive particle comprises a size of from about 10 nm to about 1000 nm.

14. An intermediate transfer member comprising:
  a substrate layer; and
  a surface layer disposed on the substrate layer comprising a plurality of core-shell particles wherein the core is a bronze particle and the shell consists of a polytetrafluoroethylene, the plurality of core-shell particles dispersed in a fluoroelastomer wherein the intermediate transfer member transfers a toner image onto a transfer material.

15. The intermediate transfer member of claim 14 wherein the surface layer comprises a water contact angle of from about 100° to about 150°.

16. The intermediate transfer member of claim 14 wherein the surface layer comprises a hexadecane contact angle of from about 50° to about 90°.

17. An intermediate transfer member comprising:
  a substrate layer; and
  a surface layer disposed on the substrate layer comprising a plurality of core-shell particles wherein the core is a carbon particle and the shell consists of a polytetrafluoroethylene, the plurality of core-shell particles dispersed in a fluoroelastomer wherein the surface layer comprises a hexadecane contact angle of from about 50° to about 90° wherein the intermediate transfer member transfers a toner image onto a transfer material.

18. The intermediate transfer member of claim 17 wherein the surface layer comprises a water contact angle of from about 100° to about 150°.

* * * * *